US010196089B2

(12) United States Patent
Herzog et al.

(10) Patent No.: US 10,196,089 B2
(45) Date of Patent: Feb. 5, 2019

(54) VEHICLE TRAILER CONTROL SYSTEM WITH WIRELESS CAPABILITY (71) Applicant: Continental Automotive Systems, Inc., Auburn Hills, MI (US)

(72) Inventors: Brandon Herzog, Waterford, MI (US); Andre Payant, Rochester Hills, MI (US); Jeremy J. McClain, Oxford, MI (US); Ibro Muharemovic, Shelby Township, MI (US); Graham Fletcher, Royal Oak, MI (US); Jeffrey Weber, Royal Oak, MI (US); Dominik Froehlich, Royal Oak, MI (US); Steffen Linkenbach, Rochester Hills, MI (US); David Agnew, Clarkston, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 63 days.

(21) Appl. No.: 14/873,645

(22) Filed: Oct. 2, 2015

(65) Prior Publication Data

US 2016/0096549 A1   Apr. 7, 2016

Related U.S. Application Data (60) Provisional application No. 62/059,382, filed on Oct. 3, 2014.

(51) Int. Cl.
*B62D 13/06*   (2006.01)
(52) U.S. Cl.
CPC ................... *B62D 13/06* (2013.01)

(58) Field of Classification Search
None
See application file for complete search history.

(56) References Cited

U.S. PATENT DOCUMENTS

| | | | | |
|---|---|---|---|---|
| 5,830,702 A * | 11/1998 | Portnoy | ............... | A61K 39/145 435/69.3 |
| 6,382,326 B1 * | 5/2002 | Goins | .................. | A01B 63/145 172/239 |
| 7,347,507 B1 * | 3/2008 | Stillinger | ................... | B60T 7/20 303/20 |
| 8,909,426 B2 * | 12/2014 | Rhode | ..................... | B62D 1/22 280/426 |

(Continued)

FOREIGN PATENT DOCUMENTS

DE   102008051982 A1   6/2009

OTHER PUBLICATIONS

The Written Opinion of the International Searching Authority dated Feb. 12, 2016.

*Primary Examiner* — Jean Paul Cass (57) ABSTRACT

A method of controlling a backing system for a vehicle and trailer assembly comprises initiating a backing system mode with an electronic control unit (ECU) for the backing system when a start system input is received from a control device. At least one input is received by the ECU from the control device which includes information about a desired vehicle action. The ECU interprets from the at least one input the desired vehicle action and calculates a required vehicle response to achieve the desired vehicle action. The ECU then sends a request to at least one vehicle system to perform the calculated vehicle response.

6 Claims, 5 Drawing Sheets

(56) References Cited

U.S. PATENT DOCUMENTS

| | | | | |
|---|---|---|---|---|
| 8,930,140 B2* | 1/2015 | Trombley | ............... | G01C 21/20 |
| | | | | 348/148 |
| 9,233,710 B2* | 1/2016 | Lavoie | ................... | B62D 13/06 |
| 9,238,483 B2* | 1/2016 | Hafner | ................... | B62D 13/06 |
| 9,296,421 B2* | 3/2016 | Lavoie | ................... | B62D 13/06 |
| 9,315,212 B1* | 4/2016 | Kyrtsos | ............... | G05D 1/0088 |
| 9,500,497 B2* | 11/2016 | Lavoie | ............... | G01C 21/3676 |
| 9,506,774 B2* | 11/2016 | Shutko | ............... | G01C 21/3647 |
| 9,511,799 B2* | 12/2016 | Lavoie | ................ | B62D 15/0275 |
| 9,517,794 B2* | 12/2016 | Lavoie | ................... | B62D 13/06 |
| 9,522,677 B2* | 12/2016 | Lavoie | ................... | B62D 13/06 |
| 9,522,699 B2* | 12/2016 | Raad | ...................... | B62D 13/06 |
| 9,533,683 B2* | 1/2017 | Lavoie | ................... | B60W 10/18 |
| 9,540,043 B2* | 1/2017 | Lavoie | ................... | B62D 15/0285 |
| 9,777,698 B2* | 10/2017 | Schlak | ................... | F03B 13/00 |
| 2004/0186644 A1* | 9/2004 | McClure | ............... | A01B 69/008 |
| | | | | 701/50 |
| 2007/0198190 A1 | 8/2007 | Bauer | | |
| 2008/0309156 A1* | 12/2008 | Kissel | ...................... | B60T 7/20 |
| | | | | 303/20 |
| 2012/0185131 A1* | 7/2012 | Headley | ................ | B60D 1/245 |
| | | | | 701/41 |
| 2012/0271522 A1* | 10/2012 | Rupp | ..................... | B62D 13/06 |
| | | | | 701/70 |
| 2013/0006472 A1 | 1/2013 | McClain | | |
| 2014/0277942 A1* | 9/2014 | Kyrtsos | ................. | G01B 21/02 |
| | | | | 701/41 |
| 2015/0203156 A1* | 7/2015 | Hafner | ................... | B62D 13/06 |
| | | | | 701/36 |
| 2016/0059889 A1* | 3/2016 | Herzog | ................. | B62D 13/06 |
| | | | | 701/41 |
| 2017/0146997 A1* | 5/2017 | Bear | ................ | H04N 21/42224 |

\* cited by examiner

VEHICLE TRAILER CONTROL SYSTEM WITH WIRELESS CAPABILITY

CROSS REFERENCE TO RELATED APPLICATION

This application claims priority to U.S. Provisional Application No. 62/0059,382 filed on Oct. 3, 2014.

TECHNICAL FIELD

The present disclosure relates to automotive vehicles and more particularly to advance driver assistance systems for automotive vehicles.

BACKGROUND

A trailer is typically connected to a towing vehicle through a trailer hitch. The trailer hitch allows the trailer to swivel around the hitch horizontally so that the vehicle-trailer unit is able to move around corners. This, however, can pose difficulties when the vehicle is traveling in the reverse. When the vehicle backs up, it pushes the trailer. In certain situations, it is important that the trailer moves straight ahead or along an intended path, for example when taking a boat to water and the trailer needs to roll down into the water. Drivers are often confused as to which way to turn the vehicle steering wheel to get the desired change of direction of the trailer. Applying an incorrect steering angle in the vehicle may also cause the trailer to jack-knife and lose its course.

Therefore, backing of trailers attached to vehicles often requires multiple persons to effectively control the vehicle and direct the path the vehicle and trailer are required to travel. Additionally, those unaccustomed to operating vehicle and trailer systems may have some difficulty in accurately controlling the path of the trailer while backing the vehicle and trailer.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of controlling a backing system for a vehicle and trailer assembly comprises initiating a backing system mode with an electronic control unit (ECU) for the backing system when a start system input is received from a control device. At least one input is received by the ECU from the control device which includes information about a desired vehicle action. The ECU interprets from the at least one input the desired vehicle action and calculates a required vehicle response to achieve the desired vehicle action. The ECU then sends a request to at least one vehicle system to perform the calculated vehicle response.

A backing system for a vehicle and trailer assembly comprises a control device and an ECU connected to the control device to receive at least one input from the control device. The ECU includes instructions for initiating a backing system mode for the vehicle when a start system input is received from the control device, receiving at least one input from the control device which includes information about a desired vehicle action, interpreting from the at least one input the desired vehicle action, calculating a required vehicle response to achieve the desired vehicle action, and sending a request to at least one vehicle system to perform the calculated vehicle response.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
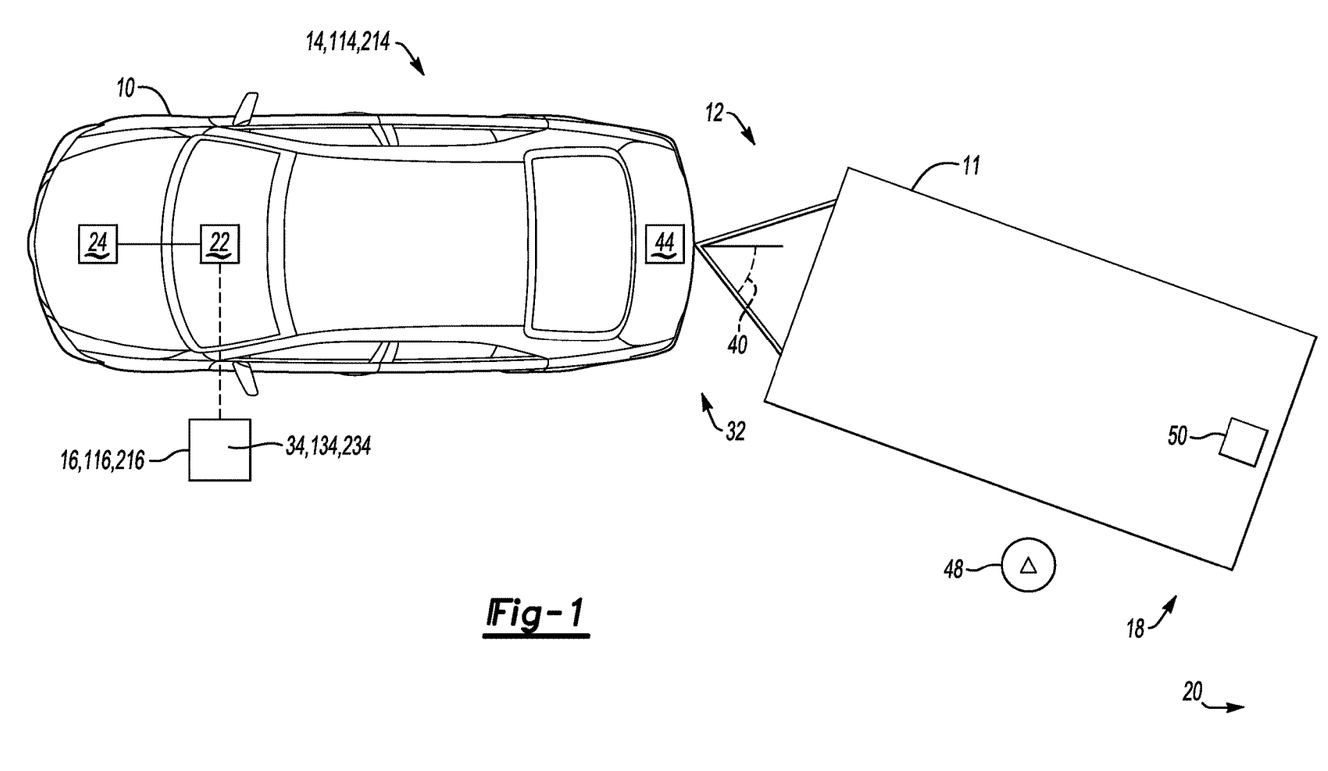
FIG. 1 is a schematic diagram of a vehicle and trailer assembly having a trailer backing system of the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle 10 and a trailer 11. The trailer 11 is controllably secured to the vehicle 10 to form a vehicle and trailer assembly 12. The vehicle and trailer assembly 12 utilizes a trailer backing program 14 of the present invention. Throughout the application the relative directions of forward and rear are used in the traditional manner. That is, in reference to the direction which an operator for the vehicle 10 would typically be facing when operating the vehicle 10. Therefore, in operation of the trailer backing program 14 the vehicle 10 would be in a reverse gear and the vehicle and trailer assembly 12 are moving backward.

Figure 2:
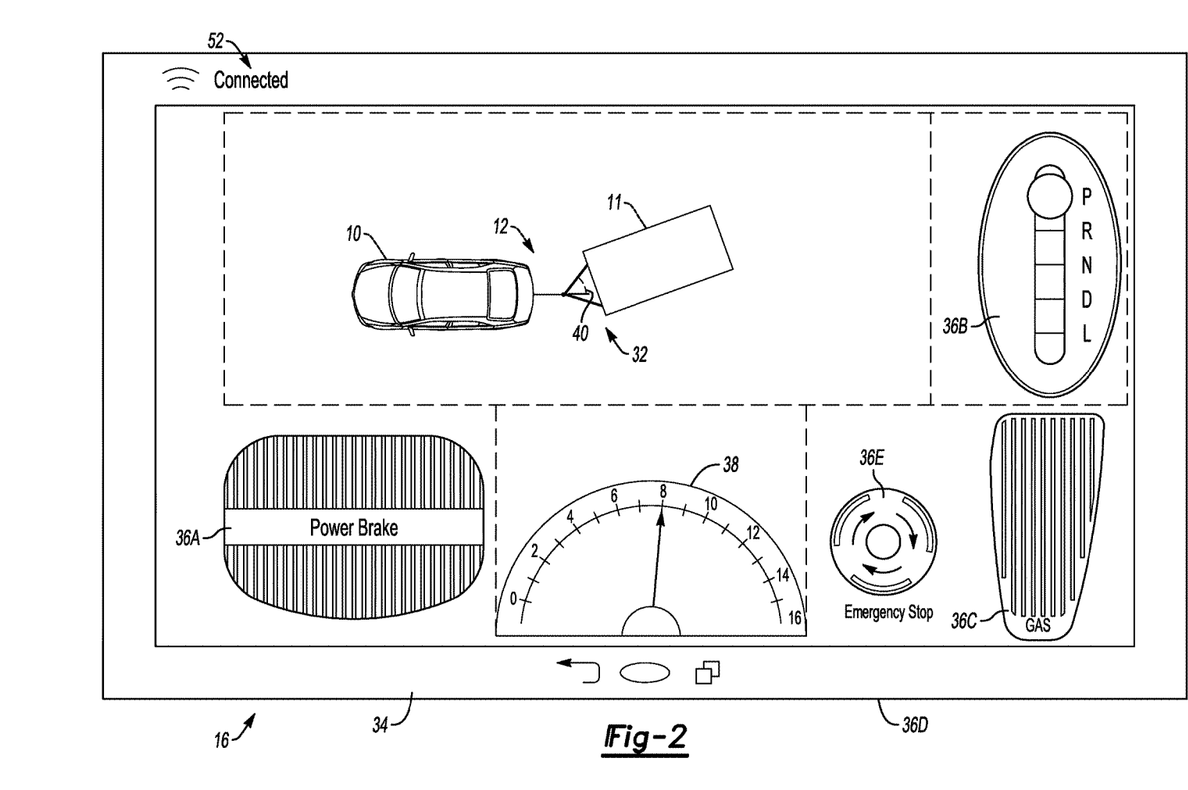
FIG. 2 is a first embodiment for the trailer backing system of FIG. 1, where the wireless controller is a mobile device and the graphical look shown on the screen is illustrated.
Figure 3:
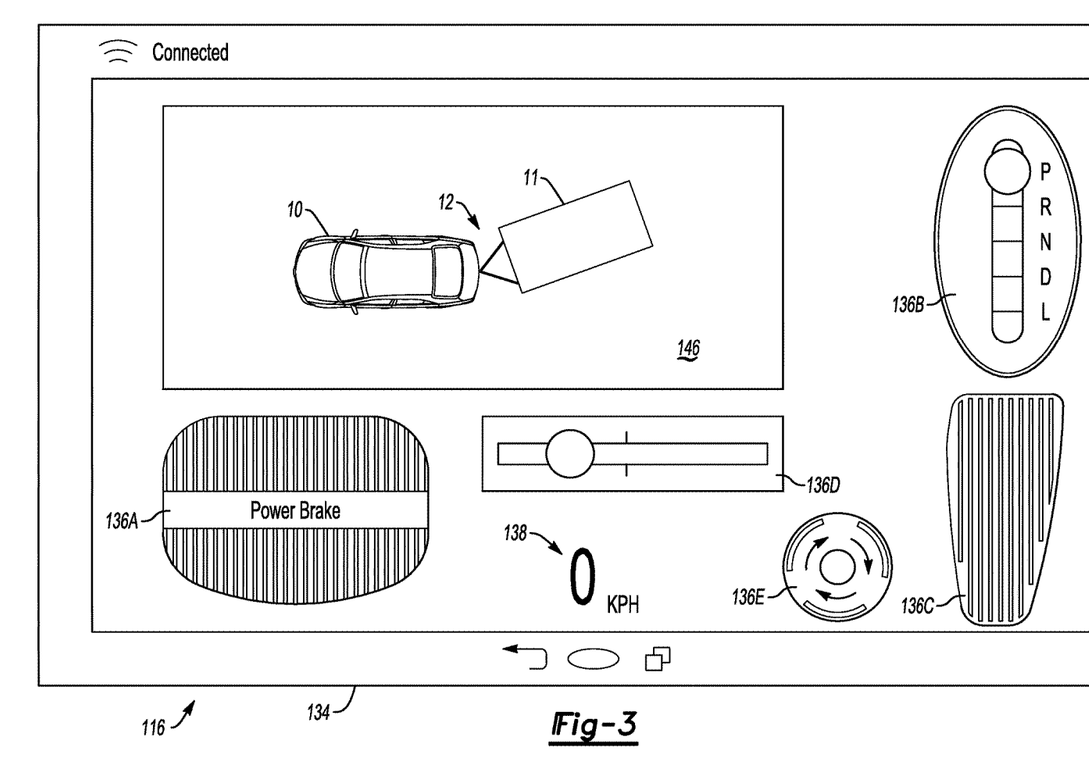
FIG. 3 shows another embodiment of a graphical look of the screen for the mobile device for the trailer backing system of FIGS. 1-2.

Referring to FIGS. 1-3, a first embodiment for utilizing the trailer backing program 14 is described. A wireless control device 16 is wirelessly connected to allow a user to input instructions to an electronic control unit (ECU) 22 for the trailer backing program 14. The ECU 22 may be connected to various vehicle systems 24 such as a powertrain system, a steering system, a brake system, etc. to control and direct movement of the vehicle and trailer assembly 12. The ECU 22 sends instructions to the vehicle systems 24 to move the vehicle and trailer assembly 12 along a desired backing path 18 to a final location 20 based upon user inputs.

The wireless control device 16 may be a tablet or other mobile device that can be operated from outside the vehicle 10. Therefore, the trailer backing system 14 gives a user control of the vehicle 10 while outside the car. For example, the user can shift gears of the vehicle 10, e.g. from park to reverse and back again. The wireless control device 16 allows the user to maneuver the vehicle trailer 12. The control device 16 may have various input options to control the vehicle trailer 12 including control and/or virtual display of: the gear selector (to enable wireless shifting between gears), a gas pedal, a brake pedal, a digital speedometer, a surround view and an emergency stop button. The emergency stop button may be implemented as a safety measure and will bring the vehicle 10 to an immediate stop and shift the vehicle 10 into Park when wireless control is active.

The ECU 22 receives a variety of inputs 26 (shown in FIG. 4) from the control device 16 to control the vehicle and trailer assembly 12 with the backing system 22. The ECU 22 interprets the various inputs 26, and determines the desired vehicle action 28 (shown in FIG. 4) that the input 26 is requesting. Based upon a current status 32 of the vehicle and trailer assembly 12, and the desired vehicle action 28 the ECU 22 determines a required vehicle response 30 (shown in FIG. 4) needed to achieve the desired vehicle action 28, and sends the appropriate signal(s) to instruct the various vehicle systems 24 to perform the calculated vehicle response 30, as explained in the various examples below. The backing system 22 can incorporate the variety of input requests to provide complete user control of the vehicle and trailer assembly 12 from outside the vehicle 10.

One example input 26A allows the user to apply the brakes of the vehicle 10. A display screen 34 for the control device 16 may include a brake pedal image 36. By the user tapping/selecting the image 36 a first input 26A is sent to the ECU 22. The ECU 22 interprets from the first input 26A that the desired vehicle action 28 is a brake request. Interpreting the first input 26A signal to determine the desired vehicle action 28, may include interpreting from the signal information requested braking rate, requested braking time, etc. For example, the first input 26A signal may include information that the user tapped and released the image 36A. The ECU 22 can interpret this information to be a request for a short application and release of the brakes. Alternatively, the first input 26A signal may include information that the user tapped and held the image 36A. The ECU 22 can interpret this information to be a request to apply and hold the brakes. Therefore, ECU 22 interprets the input signal 26A to determine the desired vehicle action 28, and then calculates the required vehicle response 30, e.g. partial brake pressure application, and release when desired pressure is achieved. The ECU 22 then sends the appropriate signal(s) to instruct the vehicle brake system 24 to perform the calculated response 30.

Another example input 26B allows the user to shift gears of the vehicle 10, e.g. from park to reverse. The display screen 34 may include a gear selector image 36B. The image shown is a typical PRND position selector which shows which gear the vehicle is in, at the start the vehicle 10 is in the park position. The user can select and move the gear selector in the image 36B to a desired gear position, e.g. reverse). The user may also be required to request vehicle brake apply (as described above) while moving the gear selector, as is typical when shifting gears inside the vehicle. A second input 26B is sent to the ECU 22. The ECU 22 interprets from the second input 26B that the desired vehicle action 28 is a gear shift request. Interpreting the second input 26B signal to determine the desired vehicle action 28, includes interpreting from the signal information which gear has been selected. The, ECU 22 interprets the input signal 26B to determine the desired vehicle action 28, and then calculates the required vehicle response 30, e.g. gear shift. The ECU 22 then sends the appropriate signal(s) to instruct the vehicle drive system 24 to perform the calculated response 30, e.g. shift into reverse. When the vehicle 10 is shifted into gear from the park position the engine continues to idle. Engine idle will probably provide enough power for the vehicle and trailer assembly 12 to begin moving at a walking pace allowing the user to walk along with the vehicle and trailer assembly 12 during the backing process if so desired. In further detail, the ECU 22 interprets the control device 16 inputs as user request relating to gear shifting, where the user request is entered by dragging on PRND 36B which triggers a shifting event. The ECU 22 responds to the input with ACK or NACK (acknowledged or not acknowledged) and vehicle is shifted safely which, allows forward and reverse control for corrections.

Once the backing system 14 is operating and the vehicle 10 is in reverse the ECU 22 can receive input from the user to control the speed of the vehicle and trailer assembly through a virtual gas pedal 36C, and the previously described virtual brake pedal 36A. For safety, since the user is not in the vehicle 10, the virtual gas pedal 36C must be periodically tapped/selected. The ECU 22 receives the input signal 22C from the virtual gas pedal 36C and interprets the signal to allowing continuing movement of the vehicle and trailer assembly 12. The periodic tapping/selecting simulates a continuous driver intent which ensures that the user is still actively in control. Should the user stop tapping/selecting the virtual gas pedal 36C the vehicle 10 will decelerate until stopped. Deceleration to stop may also occur when holding the virtual gas pedal in pressed state.

However, acceleration of the vehicle and trailer assembly 12 may be desired under some circumstances, such as when moving the vehicle and trailer assembly 12 uphill. In this instance, the user input may need to change to reflect the desired vehicle action 28. The desire to accelerate may be increasing the rate of periodically tapping/selecting the virtual gas pedal 36C, for each periodic tap holding the pedal for a slightly longer time period, or holding the virtual gas pedal down continuously. In all situations where acceleration is requested the maximum vehicle speed allowed would still be limited for safety.

A virtual speedometer 38 can also be displayed showing the speed of the vehicle 10. The virtual speedometer 38 can have color codes illustrating different speed recommendations, provided by the ECU 22, for the vehicle and trailer assembly 12 when using the backing system 14.

Once the backing system 14 is operating and the vehicle is in reverse the user can also control the trailer 11 travel direction by providing the appropriate input 26C from the control device 22 to the ECU 22. In one embodiment, tilting the device 16 can be used to provide a steering input 26D. Accelerometer readings available on the smart device 16 are measured and sent to the ECU 16 as part of a steering input signal 26D. Interpreting the steering input 26D to determine the desired vehicle action 28, may include interpreting from the signal information for direction of accelerometer reading, corresponding to requested direction of travel, and amount of acceleration, corresponding to increasing/decreasing hitch angle. The desired vehicle action 28 is movement of the trailer 11 in a certain direction and a certain amount. The ECU 22 interprets this desired vehicle action 28, as the hitch angle required to move the trailer 11 in the desired direction. The ECU calculates the hitch angle requested 28 based on the input 26D. The ECU 22 then calculates the required vehicle response 30, which is the steering angle needed to move the trailer 11 to the desired hitch angle. The required steering angle 30 is based on the current steering angle, the current hitch angle (see further details below on measuring current hitch angle) and the requested hitch angle 28. Once the ECU 22 has calculated the steering angle needed the ECU 22 then sends the appropriate signal(s) to instruct the vehicle steering system 24 to adjust to the calculated response 30.

In another embodiment, the display screen 34 may include a selector and slider bar image 36D and travel direction of the trailer 11 can be controlled by moving the selector along the slider bar 36D. A steering input 26D is sent to the ECU 22. The ECU 22 interprets from the steering input 26D that the desired vehicle action 28 is a steering request. Interpreting the steering input 26D to determine the desired vehicle action 28, may include interpreting from the signal information the direction of selector movement, corresponding to requested direction of travel, and amount of selector movement on the slider bar, corresponding to increasing/decreasing hitch angle. The desired vehicle action 28 is movement of the trailer 11 in a certain direction and a certain amount. The ECU 22 interprets this desired vehicle action 28, as the hitch angle required to move the trailer 11 in the desired direction. The ECU calculates the hitch angle requested 28 based on the input 26D. The ECU 22 then calculates the required vehicle response 30, which is the steering angle needed to move the trailer 11 to the desired hitch angle. The required steering angle 30 is based on the current steering angle, the current hitch angle (see further details below on measuring current hitch angle) and the requested hitch angle 28. Once the ECU 22 has calculated the steering angle needed the ECU 22 then sends the appropriate signal(s) to instruct the vehicle steering system 24 to adjust to the calculated response 30.

A display screen 34 for the control device 16 may include a brake pedal image 36. By the user tapping/selecting the image 36 a first input 26A is sent to the ECU 22. The ECU 22 interprets from the first input 26A that the desired vehicle action 28 is a brake request. Interpreting the first input 26A signal to determine the desired vehicle action 28, may include interpreting from the signal information requested braking rate, requested braking time, etc. For example, the first input 26A signal may include information that the user tapped and released the image 36A. The ECU 22 can interpret this information to be a request for a short application and release of the brakes. Alternatively, the first input 26A signal may include information that the user tapped and held the image 36A. The ECU 22 can interpret this information to be a request to apply and hold the brakes. Therefore, ECU 22 interprets the input signal 26A to determine the desired vehicle action 28, and then calculates the required vehicle response 30, e.g. partial brake pressure application, and release when desired pressure is achieved. The ECU 22 then sends the appropriate signal(s) to instruct the vehicle brake system 24 to perform the calculated response 30.

In further detail, the backing system 14 may have a variety of safety features, including ECU 22 control of emergency Stop. An emergency stop image 36E may be separate from a brake image 36A. An emergency stop input 26E may be triggered by pressing the emergency stop image 36E. The ECU 22 may interpret the desired vehicle action 28 and the required vehicle response 30 to both (emergency) stopping of the vehicle 10 and placing the transmission into a park mode, when safe. A backing system on/off switch 42 (not shown) may require specific release (press image 36F to light up) in order for the ECU 22 to shift control of the vehicle 10 to the user through the backing system 14. For safety the backing system 14 may include a feature to detect user attentiveness and confirm that the user is actively controlling the vehicle and trailer 12, e.g. the gas pedal 36C on the screen 34 must be periodically tapped by the user to indicate actively controlling the system 14. Gradual stop occurs if the user holds or does not tap the gas pedal 36C for too long. By pressing the brake pedal on the screen gradual deceleration of vehicle to lower the speed of the assembly 12 occurs. The speed the system 12 may be limited to a safe walking speed (e.g. 2.5 kph), also limited by the minimum speed reported by the vehicle. Other safety measures may include timeout detection, redundant information confirmations such as, respond with interpreted data to check for inconsistencies, and checksum calculations and checks.

The backing system 14 may use camera(s) 44 on the vehicle 10 to provide a surround view of the vehicle 10. Additionally, the ECU 22 may use the camera 44 information as one method used to measure the current hitch angle 40. The measured hitch angle 40 is used by the ECU 22 to determine the desired steering angle 30 based on the requested hitch angle 28 calculated from the user input 26D. The current hitch angle 40 may also be displayed on the device 16 as well for user information.

The surround view of the vehicle 10 may also be integrated to display 46 on the mobile device 16. Additionally, objects 48 on the surround view image 46 can be highlighted to warn drivers of possible collisions. In particular, if the user is near the front of the vehicle 10 the vehicle 10 may rotate around at a faster than expected rate.

The surround view function presents the driver with a dynamic set of synthetic viewpoints that provide an unobstructed view of the ground both in the immediate vicinity of the vehicle 10 as well as in the medium distance. The viewpoints are completely configurable and useful for parking and reversing maneuvers. In one embodiment an extended surround view capability may be provided by using another camera 50 connected at the rear of the trailer 11 to increase visibility.

FIG. 3 shows another embodiment of a graphical look of the screen 134 for a mobile device 116 and a backing system 114. For example, once a status bar 52 shows that the device 116 is connected to the vehicle 10 via the ECU 22 then the emergency stop 136E may be depressed. Once this has been done and the red emergency stop 136E lights up then the mobile device 116 is in control of the vehicle 10. The user must press and hold the brake 136A in order to shift gears. To steer the user physically tilts the device 116, although other options of control are possible utilizing the screen 134 of the mobile device 16 or even Bluetooth/wireless connection.

Figure 4:
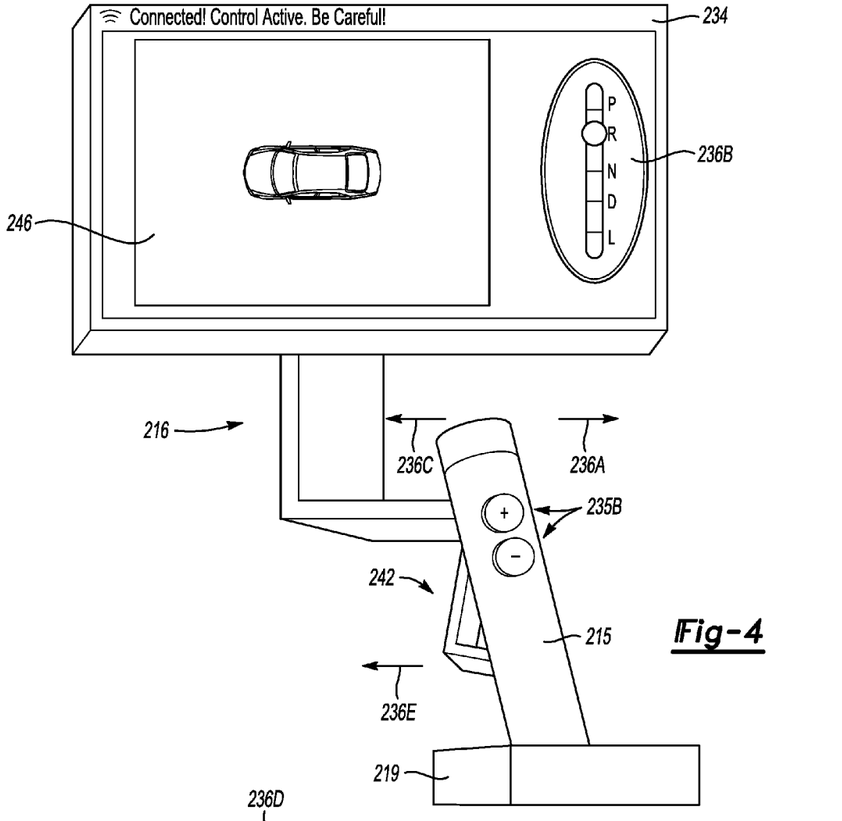
FIG. 4 is a second embodiment for the trailer backing system of FIG. 1, where the wireless controller is a joystick with a display screen and the graphical look shown on the screen is illustrated.
Figure 4A:
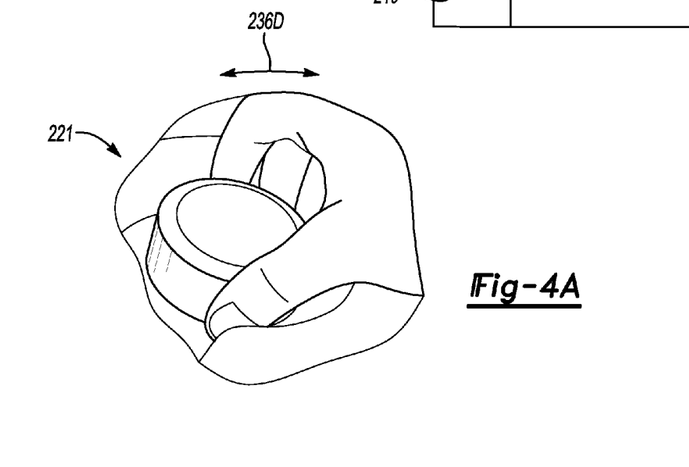
FIG. 4A is an enlarged view of a controller knob for the joystick of FIG. 4.

FIGS. 1 and 4-4A illustrate a second embodiment for utilizing the trailer backing program 214. A wireless control device 216 is wirelessly connected to allow a user to input instructions to an electronic control unit (ECU) 22 for the trailer backing program 214. The ECU 22 may be connected to various vehicle systems 24 such as a powertrain system, a steering system, a brake system, etc. to control and direct movement of the vehicle and trailer assembly 12. The ECU 22 sends instructions to the vehicle systems 24 to move the vehicle and trailer assembly 12 along a desired backing path 18 to a final location 20 based upon user inputs.

The wireless control device 216 may be a joystick assembly having a joystick 215 that moves relative to a joystick base 219 and a control knob 221 that rotates relative to the joystick 215. The joystick assembly 216 may also include a display screen 234 and a safety control button 242, as described in further detail below with a display screen that can be operated from outside the vehicle 10 and wirelessly connected to the ECU 22 with a secure connection.

Therefore, the trailer backing system 214 gives a user control of the vehicle 10 while outside the car. For example, the user can shift gears of the vehicle 10, e.g. from park to reverse and back again. The wireless control device 216 allows the user to maneuver the vehicle trailer 12. The control device 216 may have various input options to control the vehicle trailer 12 including control and/or virtual display of: the gear selector (to enable wireless shifting between gears), a gas pedal control, a brake pedal control, a digital and/or analog speedometer, a video stream from the 360 Surround View system and/or a graphical representation of the vehicle highlighting potential warning zones. An emergency stop feature may be implemented as a safety measure and will bring the vehicle 10 to an immediate stop and shift the vehicle 10 into Park when wireless control 216 is active. For example, the emergency stop feature may be activated releasing a safety control switch 242. Other methods and/or additional buttons may be used to provide an emergency stop feature. One skilled in the art would be able to determine the best arrangement for implementing an emergency stop feature for a particular joystick 216 design.

The ECU 22 receives a variety of inputs 226 (shown in FIG. 5) from the control device 216 to control the vehicle and trailer assembly 12 with the backing system 214. The ECU 22 interprets the various inputs 226, and determines the desired vehicle action 28 (shown in FIG. 5) that the input 226 is requesting. Based upon a current status 232 of the vehicle and trailer assembly 12, and the desired vehicle action 28 the ECU 22 determines a required vehicle response 30 (shown in FIG. 5) needed to achieve the desired vehicle action 28, and sends the appropriate signal(s) to instruct the various vehicle systems 24 to perform the calculated vehicle response 30, as explained in the various examples below. The backing system 214 can incorporate the variety of input requests to provide complete user control of the vehicle and trailer assembly 12 from outside the vehicle 10 over the secured wireless connection.

One example input 226A allows the user to apply the brakes of the vehicle 10. For example, while holding the joystick 215 the user may be required to press the safety control button 142. While the safety control button 242 is being depressed movement of the joystick 215, e.g. relative to a joystick base 219 toward the user 236A may be interpreted as a desired input 226A of braking the vehicle 10. That is, when the user pulls the joystick 215 towards themselves a first input 226A is sent to the ECU 22. The ECU 22 interprets from the first input 226A that the desired vehicle action 28 is a brake request. Interpreting the first input 226A signal to determine the desired vehicle action 28, may include interpreting from the signal information requested braking rate, requested braking time, etc. For example, the first input 226A signal may include information that the user pulled and released the joystick 215. The ECU 22 can interpret this information to be a request for a short application and release of the brakes. Alternatively, the first input 226A signal may include information that the user pulled and held the joystick 215. The ECU 22 can interpret this information to be a request to apply and hold the brakes. Therefore, ECU 22 interprets the input signal 226A to determine the desired vehicle action 28, and then calculates the required vehicle response 30, e.g. partial brake pressure application, and release when desired pressure is achieved.

The ECU 22 then sends the appropriate signal(s) to instruct the vehicle brake system 24 to perform the calculated response 30.

Another example input 226B allows the user to shift gears of the vehicle 10, e.g. from park to reverse. The display screen 234 may include a gear selector image 236B. The image shown is a typical PRND position selector which shows which gear the vehicle is in, at the start the vehicle 10 is in the park position. The user can select and move the gear selector in the image 236B to a desired gear position, e.g. reverse) by using the gear selector buttons 235B to move position selector up/down on the image 236B. The user may also be required to request vehicle brake apply (as described above) while moving the gear selector, as is typical when shifting gears inside the vehicle 10. A second input 226B is sent to the ECU 22. The ECU 22 interprets from the second input 226B that the desired vehicle action 28 is a gear shift request. Interpreting the second input 226B signal to determine the desired vehicle action 28, includes interpreting from the signal information which gear has been selected. The, ECU 22 interprets the input signal 226B to determine the desired vehicle action 28, and then calculates the required vehicle response 30, e.g. gear shift. The ECU 22 then sends the appropriate signal(s) to instruct the vehicle drive system 24 to perform the calculated response 30, e.g. shift into reverse. When the vehicle 10 is shifted into reverse gear from the park position the engine continues to idle. Engine idle will probably provide enough power for the vehicle and trailer assembly 12 to begin moving at a walking pace allowing the user to walk along with the vehicle and trailer assembly 12 during the backing process if so desired. The ECU 22 responds to the input 226B with ACK or NACK (acknowledged or not acknowledged) and vehicle 10 is shifted safely which, allows forward and reverse control for corrections.

Once the backing system 114 is operating and the vehicle 10 is in reverse the ECU 22 can receive input from the user to control the speed of the vehicle and trailer assembly 12 through a forward motion 236C of the joystick 115, and the previously described brake movement 236A of the joystick 115. For safety, since the user is not in the vehicle 10, the safety control button 142 must remain depressed while the vehicle and trailer assembly 12 is in motion. If the safety control button 242 is released, 236E, the ECU 22 will stop the vehicle and trailer assembly 12 and shift the vehicle 10 into park. The ECU 22 receives the input signal 226E from the virtual safety control button 242 and interprets the signal to allowing continuing movement of the vehicle and trailer assembly 12.

However, acceleration of the vehicle and trailer assembly 12 may be desired under some circumstances, such as when moving the vehicle and trailer assembly 12 uphill. In this instance, the user input may need to change to reflect the desired vehicle action 28. The desire to accelerate may be moving the joysick 215 forward 236C and holding it in the forward position. In all situations where acceleration is requested the maximum vehicle speed allowed would still be limited for safety.

Once the backing system 14 is operating and the vehicle is in reverse the user can also control the trailer 11 travel direction by providing the appropriate input 226D from the control device 22 to the ECU 22. In one embodiment, rotating a control knob 221 can be used to provide a steering input 226D. Interpreting the steering input 226D to determine the desired vehicle action 28, may include interpreting from the signal information for direction the knob 121 is moved 236D as, corresponding to requested direction of travel for the trailer 11, and amount the knob 221 is turned, i.e. rotation angle, as corresponding to increasing/decreasing hitch angle. The desired vehicle action 28 is movement of the trailer 11 in a certain direction and a certain amount. The ECU 22 interprets this desired vehicle action 28, as the hitch angle required to move the trailer 11 in the desired direction. The ECU 22 calculates the hitch angle requested 28 based on the input 226D. The ECU 22 then calculates the required vehicle response 30, which is the steering angle needed to move the trailer 11 to the desired hitch angle. The required steering angle 30 is based on the current steering angle, the current hitch angle (see further details below on measuring current hitch angle) and the requested hitch angle 28. Once the ECU 22 has calculated the steering angle needed the ECU 22 then sends the appropriate signal(s) to instruct the vehicle steering system 24 to adjust to the calculated response 30.

In further detail, the backing system 214 may have a variety of safety features, including ECU 22 control of emergency stop. When the safety control switch 242 is released the ECU 22 may interpret the desired vehicle action 28 and the required vehicle response 30 to both (emergency) stopping of the vehicle 10 and placing the transmission into a park mode, when safe. A backing system on/off switch 242 (not shown) may require specific release 1 in order for the ECU 12 to shift control of the vehicle 10 to the user through the backing system 114. The speed the assembly 12 and system 214 may be limited to a safe walking speed (e.g. 2.5 kph), also limited by the minimum speed reported by the vehicle. Other safety measures may include timeout detection, redundant information confirmations such as, respond with interpreted data to check for inconsistencies, and checksum calculations and checks.

Referring to FIGS. 1-4A, the system 14, 114, 214 must have an ECU 22 capable of connecting wirelessly, such as via an RF, WiFi, Bluetooth or another type of wireless connection, to the mobile device 16, 116, 216 and a connection to the vehicle interface(s) 24 for shift, steer, brake and engine torque control. The system 14, 114, 214 may also have a surround view camera system 44 with a stitched image 46, 146, 246 broadcasted for devices 16, 116, 216 to view. The system 14, 114, 214 must have a capable wireless device with control methods implemented for shifting, steering, speed limiting, deceleration and emergency stop, as in the embodiments described above. Other image configurations or controls 36A-E, 136A-E, 236A-E and/or programs or apps may be used to provide the inputs 26A-E, 126A-E, 226A-E. The system 14, 114, 214 must be equipped with a method to measure the trailer angle 40 and output over the vehicle connections to the ECU 22. The wireless communication between the ECU 22 and the device 16, 116, 216 must have safety implementation for data integrity and active connection checks.

The program/app for the device 16, 116, 216 allows for full input to the ECU 22 for control of the vehicle 10. A trigger safety switch 42, 142, 242 and/or control 36E, 136E, 236E can be included to confirm user attentiveness and maintain control of the vehicle 10 with the device 16, 116, 216. The device 16, 116, 216 also provides for the user to shift gears of the vehicle 10, apply the brakes, press emergency stop to park the car and cease control and view the surround view of the vehicle 10. The dead man's trigger 42, 142, 242 requires constant interaction from the user or else vehicle comes to a stop. The function is also speed limited for safe backing. The backing system 14, 114, 214 therefore works in real time, performing each of the inputs 26A-E, 126A-E, 226A-E as they are received and processed by the ECU 22.

The backing system 14, 114, 214 may use camera(s) 44 on the vehicle 10 to provide the surround view of the vehicle 10. Additionally, the ECU 22 may use the camera 44 information as one method used to measure the current hitch angle 40. The measured hitch angle 40 is used by the ECU 22 to determine the desired steering angle 30 based on the requested hitch angle 28 calculated from the user input 26D, 126D, 226D. The current hitch angle 40 may also be displayed on the screen 34, 134, 234 as well for user information.

The surround view of the vehicle 10 may also be integrated to display 46, 146, 246 on the screen 34, 134, 234. Additionally, objects 48 on the surround view image 46, 146, 246 can be highlighted to warn drivers of possible collisions. In particular, if the user is near the front of the vehicle 10 the vehicle 10 may rotate around at a faster than expected rate.

The surround view function presents the driver with a dynamic set of synthetic viewpoints that provide an unobstructed view of the ground both in the immediate vicinity of the vehicle 10 as well as in the medium distance. The viewpoints are completely configurable and useful for parking and reversing maneuvers. In one embodiment an extended surround view capability may be provided by using another camera 50 connected at the rear of the trailer 11 to increase visibility.

Figure 5:
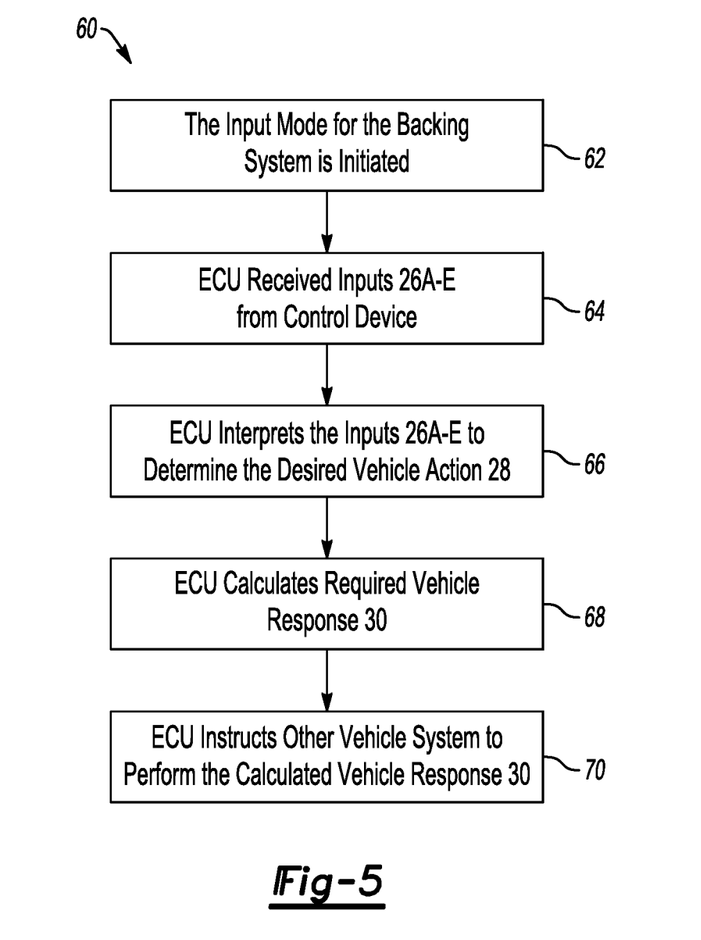
FIG. 5 illustrates a method of controlling the vehicle and trailer assembly with the trailer backing system of FIGS. 1-4A.

Referring to FIG. 5, one method of controlling the vehicle and trailer assembly 12 using a control device 16, 116, 216 with wireless capability is shown at 60. The trailer backing system 14, 114, 214 is initiated and control of the vehicle 10 is transferred to the control device 16, 116, 216, step 62. The ECU 22 receives an input(s) 26, 126, 226 from the control device 16, 116, 226 to control the vehicle and trailer assembly 12 with the backing system 14, 114, 214, step 64. The ECU 22 interprets the various inputs 26, 126, 226 and determines the desired vehicle action 28 that the input 26, 126, 226 is requesting, step 66, calculates the required vehicle response 30 to achieve the desired vehicle action 28, step 68, and instructs the various vehicle systems 24 to perform the calculated vehicle response 30, step 70.

With the trailer backing system 14, 114, 214 of the present invention one user aided by his mobile device 16, 116, 216 may back the trailer into a desired final position in a manner that is intuitive to use and does not require assistance from other people (a spotter is not required).

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of controlling a backing system for a vehicle and trailer assembly, the method comprising:
   initiating a backing system mode with an electronic control unit for a backing system when a start system input is received from a control device, the control device is wirelessly connected to the electronic control unit, the control device being a joystick assembly including a joystick, moveable relative to a joystick base, a display screen, a control knob rotatable relative to the joystick and a control safety control button;

receiving, with the electronic control unit, an accelerometer signal generated by an accelerometer of the control device;

receiving, at the electronic control unit, at least one other input from the control device, the at least one other input including information about a desired vehicle action including at least one of requests to shift gears of the vehicle, apply brakes, press emergency stop to park the vehicle and cease control, steer the vehicle, and change a surround view of the vehicle;

determining a desired hitch angle based on the accelerometer signal and the at least one other input;

receiving, with the electronic control unit, camera information from one or more cameras positioned on the vehicle, the one or more cameras in communication with the electronic control unit;

determining, with the electronic control unit, a current hitch angle for the vehicle and trailer assembly based on the camera information;

determining, with the electronic control unit, a vehicle steering angle based on the current hitch angle and the desired hitch angle to move the trailer to the desired hitch angle;

when the control safety control button is depressed, calculating, with the electronic control unit, a required vehicle response based on the vehicle steering angle to achieve the desired hitch angle; and sending a request from the electronic control unit to at least one vehicle system to perform the calculated vehicle response causing a trailer of the vehicle and trailer assembly to move to the desired hitch angle.

2. The method of claim 1, further comprising:
determining the desired vehicle action based on the at least one other input; and
calculating with the electronic control unit a required vehicle response to achieve the desired vehicle angle and the desired hitch angle;
wherein the vehicle and trailer assembly move in real time with the at least one other input received by the electronic control unit.

3. The method of claim 2, wherein the control device has a display screen configured to be a human machine interface capable of receiving the at least one other inputs.

4. A backing system for a vehicle and trailer assembly, the backing system comprising:
a wireless control device having an accelerometer for producing an accelerometer signal, the wireless control device being a joystick assembly including a joystick, moveable relative to a joystick base, a display screen, a control knob rotatable relative to the joystick and a control safety control button; and an electronic control unit, wirelessly connected to the wireless control device to receive at least one input from the wireless control device, wherein the electronic control unit includes instructions for:
initiating a backing system mode for the vehicle when a start system input is received from the control device;
receiving the accelerometer signal from the control device;
receiving at least one other input from the control device, the at least one other input including information about a desired vehicle action including at least one of requests to shift gears of the vehicle, apply brakes press emergency stop to park the vehicle and cease control, steer the vehicle, and change a surround view of the vehicle;
determining a desired hitch angle from the accelerometer signal and the at least one other input;
receiving camera information from one or more cameras positioned on the vehicle, the one or more cameras in communication with the electronic control unit;
determining a current hitch angle for the vehicle and trailer assembly based on the camera information, the current hitch angle being an angle between the vehicle and the trailer;
determining a vehicle steering angle based on the current hitch angle and the desired hitch angle to move the trailer to the drained hitch angle;
when the control safety control button is depressed, calculating a required vehicle response based on the determined vehicle steering angle to achieve the desired hitch angle; and
sending a request to at least one vehicle system to perform the calculated vehicle response causing the trailer to move to the desired hitch angle.

5. The system of claim 4, wherein the electronic control unit further comprises instructions for:
interpreting the desired vehicle action from the at least one other input; and
calculating a required vehicle response to achieve the desired vehicle angle and the desired hitch angle; and
wherein the vehicle and trailer assembly move in real time with the at least one other input received by the electronic control unit.

6. The system of claim 5, wherein the control device has a display screen configured to be a human machine interface capable of receiving the at least one other inputs.

* * * * *